(12) United States Patent
Cui et al.

(10) Patent No.: US 12,517,487 B2
(45) Date of Patent: Jan. 6, 2026

(54) SYSTEM AND METHOD FOR ENABLING SCALABLE PROCESSING THROUGHPUT OF HIGH-VOLUME DATA ON INDUSTRIAL CONTROLLERS

(71) Applicant: Siemens Aktiengesellschaft, Munich (DE)

(72) Inventors: Tao Cui, Princeton Junction, NJ (US); Lingyun Wang, Princeton, NJ (US); Alessandra Oliveira Da Silva, Atlanta, GA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/710,210

(22) PCT Filed: Dec. 29, 2021

(86) PCT No.: PCT/US2021/065422
§ 371 (c)(1),
(2) Date: May 15, 2024

(87) PCT Pub. No.: WO2023/129143
PCT Pub. Date: Jul. 6, 2023

(65) Prior Publication Data
US 2024/0427304 A1 Dec. 26, 2024

(51) Int. Cl.
*G05B 19/05* (2006.01)
(52) U.S. Cl.
CPC .. *G05B 19/052* (2013.01); *G05B 2219/13144* (2013.01); *G05B 2219/15052* (2013.01)

(58) Field of Classification Search
CPC ........ G05B 19/052; G05B 2219/13144; G05B 2219/15052
See application file for complete search history.

(56) References Cited

U.S. PATENT DOCUMENTS

| | | | |
|---|---|---|---|
| 10,768,076 B1* | 9/2020 | Oostendorp | G01M 99/005 |
| 2008/0267181 A1* | 10/2008 | Monga | H04L 45/306 370/390 |
| 2014/0277592 A1* | 9/2014 | Crater | G05B 19/052 700/9 |
| 2019/0261065 A1* | 8/2019 | Lokshin | G06V 10/82 |
| 2021/0037107 A1* | 2/2021 | Klenk | H04L 12/1886 |
| 2021/0266145 A1 | 8/2021 | Chen et al. | |
| 2022/0019200 A1* | 1/2022 | Drews | G05B 19/41835 |

* cited by examiner

*Primary Examiner* — Tameem D Siddiquee

(57) ABSTRACT

A system for processing data in an industrial environment includes a sensor that communicates sensor data acquired from a factory floor as a multicast data stream where each frame is tagged with a sequence identifier indicative of a position of that frame in the data stream. A network switch distributes the data stream to a group of multicast endpoints. The system includes a controller with a plurality of modularly connected processing units. Each processing unit is further connected to the network switch and configured as a respective endpoint of the group of multicast endpoints. Each processing unit selectively processes frames of the data stream in dependence of the sequence identifier of individual frames by executing a data processing module, to produce an output result associated with each processed frame. The controller assembles the output result and the sequence identifier of each processed frame from the plurality of processing units.

20 Claims, 3 Drawing Sheets

SYSTEM AND METHOD FOR ENABLING SCALABLE PROCESSING THROUGHPUT OF HIGH-VOLUME DATA ON INDUSTRIAL CONTROLLERS

TECHNICAL FIELD

The present disclosure generally relates to processing of data by industrial controllers, and in particular, to a system and method for processing high-volume data by an industrial controller in real time.

BACKGROUND

High speed, high bandwidth streaming data processing is becoming more and more critical and essential for industrial automation systems now and in the future. Such high-volume streaming data are often of rich context (e.g. vision, audio, etc.), which enables advanced artificial intelligence applications, such as object detection, classification, and autonomous robotic operations.

For example, industrial automation systems in the manufacturing industry may often require processing of high frame rate, high definition (HD) vision data in a discrete control system on a production line for carrying out quality assessment and production line control. In this case, a HD camera may be operated at high frame rate (FPS) to generate high resolution images. The images may be analyzed, for example, through deep neural networks and/or other computer vision methods and models, in real time, to determine one or more quality aspects of the product on the production line. Based on the inspection result, control action may be executed, for example, via actuators (e.g., a robotic arm) arranged downstream on the production line. A high FPS of data processing is often necessary since a large-scale production line is usually operated at a high speed.

A typical control system for an automated production line may use state-of-the-art industrial controllers, such as programmable logic controllers (PLC). However, traditionally, industrial controllers are designed for high reliability and determinism (e.g., through hard wire controller or real time operating system). Such industrial controllers are not designed for high performance computing of high-volume rich context data. Given the rising trend of high-volume data in industrial automation systems, a technology gap is emerging.

SUMMARY

Briefly, aspects of the present disclosure address at least some of the above-described technical problems by providing a technique for enabling scalable processing throughput of high-volume data on industrial control systems.

A first aspect of the disclosure provides a system for processing data in an industrial environment. The system comprises at least one sensor configured to communicate sensor data acquired from a factory floor as a multicast data stream. Each frame of the data stream is tagged with a sequence identifier indicative of a position of that frame in the data stream. The system also comprises at least one network switch configured to distribute the data stream communicated by the sensor to a group of multicast endpoints. The system further comprises a control system comprising a controller and a plurality of processing units modularly connected to the controller. Each processing unit is further connected to the network switch and configured as a respective endpoint of the group of multicast endpoints.

Each processing unit is configured to selectively process frames of the data stream in dependence of the sequence identifier of individual frames by executing a data processing module, to produce an output result associated with each processed frame. The controller is configured to assemble the output result and the sequence identifier of each processed frame from the plurality of processing units.

A further aspect of the disclosure uses the above-described system to execute a method for processing data in an industrial environment.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Figure 1:
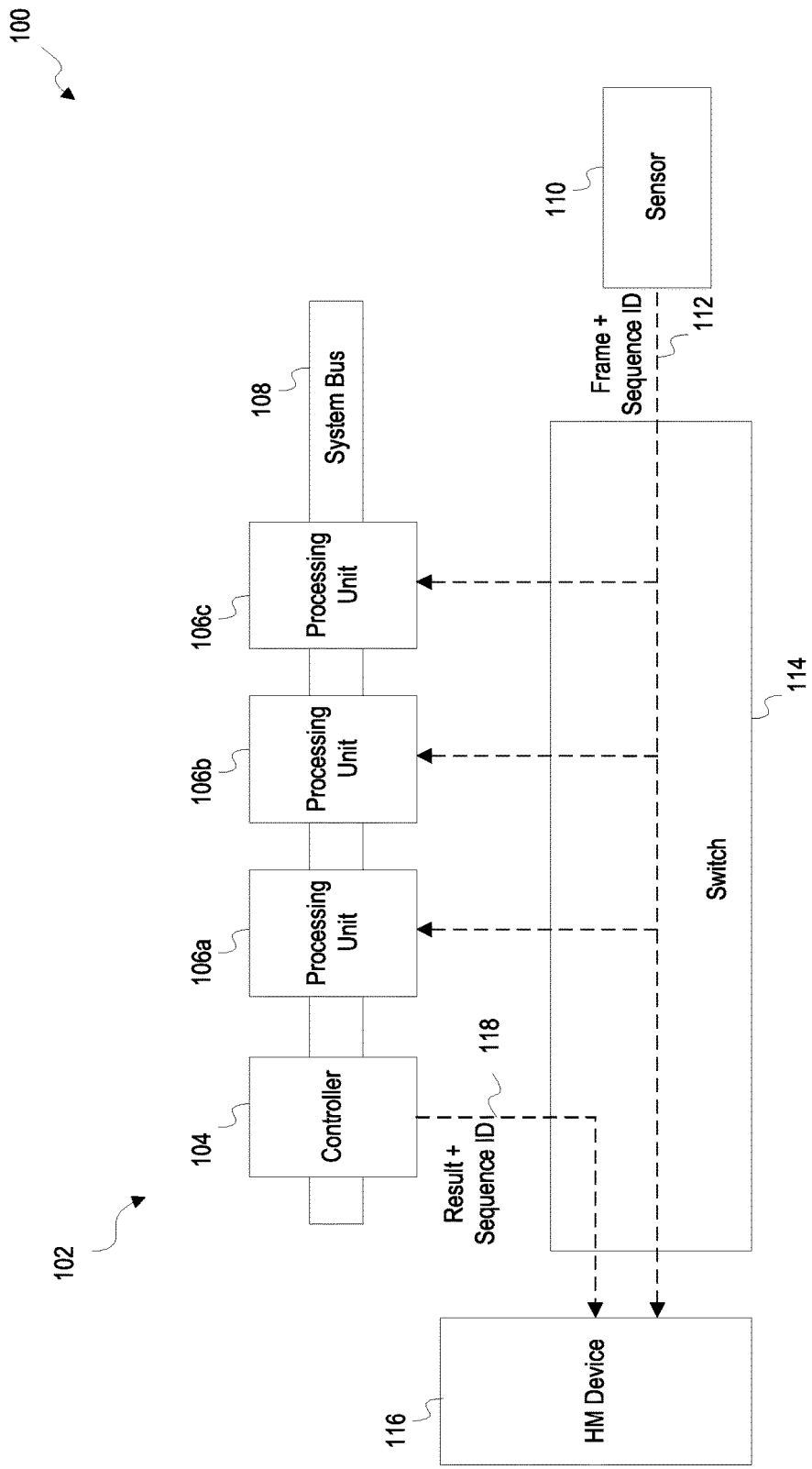
FIG. 1 is a schematic block diagram illustrating an example of a system for processing data that provides scalable processing throughput via modular parallelization.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

It is recognized that many current industrial control systems employ artificial intelligence (AI) accelerators and edge computing platforms aiming to close the technology gap of being able to process rich context high-volume data acquired from a factory floor, for example, using cameras, microphones, or other types of sensors, to perform inspection and robotic manipulation tasks in real time. However, such industrial control systems are typically not designed as high-performance computing systems. For instance, computational powers of present-day AI accelerators may not be comparable to a high-end CPU-based or GPU-based PC. As an example, a single unit of an AI accelerator may not be able to efficiently perform object detection via deep neural networks on HD vision data (e.g., 1280×1024 resolution or higher) at a high frame rate (e.g., 20 FPS or higher). The performance may be constrained by various factors, such as operations per second (OPS) or floating operations per second (FLOPS) limits of the hardware. The above may not necessarily be a drawback and the design is often justifiable if the design goal of those industrial control systems are still reliability and determinism. For example, AI accelerators can be extremely helpful in computing neural networks for industrial use as their hardware implementation can reduce jitters and uncertainties in runtime (determinism) and at a lower power consumption.

Aspects of the present disclosure aim to address the above-described technical challenge, making it possible for an industrial control system to deliver a high level of computational performance for processing high-volume data in real time. The disclosed methodology can achieve the above objective without needing to deploy high-end PCs (e.g., including high-performance CPU or GPU), thus taking full advantage of the design principle of standard industrial controllers (e.g., as described above). The objective may be enabled by an inventive combination of three key features, namely, packetization and sequential tagging of streaming sensor data, use of a multicast protocol for communication of the streaming sensor data and customization of the industrial control system based on modular design to distribute the processing tasks. These features, in combination, provide a highly scalable processing throughput of high-volume data by the industrial control system that is not constrained by network bandwidth limitations nor the limitations of a single processing unit.

Turning now to the drawings, FIG. 1 illustrates a system 100 for processing data in an industrial environment, according to one or more embodiments of the disclosure. One suitable application of the disclosed methodology may be in a production line, for example, for carrying out inspection or robotic manipulation tasks. However, the use cases illustrated herein are exemplary and the disclosed methodology can potentially find many industrial applications that require processing of high-volume data in real time on industrial control systems.

Continuing with reference to FIG. 1, the system 100 comprises an industrial control system 102 that includes a controller 104 and a plurality of processing units (in this example, three processing units are shown, namely, 106*a*, 106*b*, 106*c*) modularly connected to the controller 104. The controller 104 can include, for example, a PLC or another type of industrial controller, including, for example, an embedded controller. The controller 104 may comprise a memory storing one or more data processing modules executable by the processing units 106*a*, 106*b*, 106*c*. The term "data processing module", as used herein, refers to a software component or part of a computer program that contains one or more routines. In one embodiment, a data processing module can comprise an AI algorithm, such as a neural network.

The processing units 106*a*, 106*b*, 106*c*, may be connected to a system bus 108 of the controller 104. For example, the processing units 106*a*, 106*b*, 106*c* may be plugged to a backplane (system bus) of a PLC 104. An example embodiment of a processing unit 106*a*, 106*b*, 106*c* suitable for the present application is a neural processing unit (NPU). An NPU comprises dedicated edge AI hardware which may be custom designed to run deep neural networks in a computationally efficient fashion. In another example embodiment, the processing units 106*a*, 106*b*, 106*c* may include small PCs connected to the controller system bus 108.

In one suitable implementation, the industrial control system 102 may be realized by a SIMATIC S7-1500™ controller manufactured by Siemens AG, where it is possible to stack a large number of NPUs on to a PLC to extend its computational capability. In another example implementation, the industrial control system 102 may be realized by an open controller, such as a SIMATIC ET 200SP™ open controller manufactured by Siemens AG, that can allow multiple processing units to be embedded into the controller itself.

The system 100 comprises a sensor 110 that can acquire sensor data from a factory floor. In the disclosed use case, the factory floor comprises a production line. The sensor 110 may comprise, for example, a vision camera, or a microphone, configured to capture sensor data (e.g., images or audio signals) pertaining to products being conveyed on the production line. Other examples of sensors for industrial use cases may include electrical measurement sensors, such as current and voltage sensors, among others.

The sensor 110 is configured to communicate the acquired sensor data as a packetized data stream comprising a sequence of data frames or data packets (referred to herein as "frames"). The sensor 110 is further configured to tag each frame of the data stream with a sequence identifier that is indicative of a position of the frame in the data stream. The sequence identifier may include, for example, a timestamp tagged to the frame, which may be indicative of a real-world time when the particular frame was captured by the sensor 110. This is a standard approach in many vision, audio and other sensor communication protocols, especially Ethernet based protocols. For example, GigE Vision®, which is a widely used vision sensor communication protocol for industrial automation systems, requires frames streamed on Ethernet to have timestamps and sequence numbers attached to the frames.

The sensor 110 is further configured to communicate the acquired sensor data as a multicast data stream 112 using a multicast communication protocol. Multicasting refers to a group communication where a single data stream is addressed to a group of destination computing nodes (referred to herein "endpoints") simultaneously. To that end, the system 100 includes a network switch 114 that supports multicast data streaming, typically a GigE switch. In the present example, the network switch 114 is configured to distribute the single data stream 112 communicated by the sensor 110 to a group of multicast endpoints. Each of the processing units 106*a*, 106*b*, 106*c* is connected to the network switch 114 and configured as a respective endpoint of the group of multicast endpoints that can subscribe to the multicast data stream 112. The network switch 114 may comprise a plurality of ports enabling Ethernet communication links individually with processing units 106*a*, 106*b*, 106*c* and the sensor 110. Multicasting may ensure that the bandwidth requirement is only determined by the single data stream, not by the number of endpoints. Thereby, the network bandwidth may not limit the number of endpoints connected to the Ethernet.

In one embodiment, the data stream 112 may be communicated from the sensor 110 to the processing units 106*a*, 106*b*, 106*c* via IP multicasting. IP multicasting refers to a method of sending Internet Protocol (IP) datagrams to a group of interested endpoints. IP multicasting is supported by many sensors, such as GigE Vision® industrial cameras, as a standard protocol option (e.g., using UDP standard protocol). In the present example, a group IP address may be used by the sensor 110 and the processing units 106a, 106b, 106c to respectively send and receive the multicast data stream 112. The sensor 110 may use the group IP address as the destination IP address in the frames or packets of the data stream 112 communicated by the sensor 110. The processing units 106a, 106b, 106c may use this group IP address to subscribe or inform the network that they are interested in receiving frames or packets sent to that group (e.g., using IGMP standard protocol).

Another approach widely used for streaming sensor data to multiple endpoints involves multicasting at the Ethernet layer. As an example, many current and voltage sensors support multicasting of real time electrical measurement data using the standard protocol IEC 61850-9-2. Furthermore, standards such as DDS, OPC PubSub, AVB, among others, also support multicast data streaming in different formats.

The industrial control system 102 can thus process the single data stream 112 via multiple processing units 106a, 106b, 106c using minimum network bandwidth as required based on the single data stream 112. Each processing unit 106a, 106b, 106c is configured to selectively process frames of the data stream 112 in dependence of the sequence identifier (e.g., timestamp or sequence number) of individual frames. A frame, when selected to be processed by a processing unit 106a, 106b, 106c, is fed as an input to a data processing module, which is executed by that processing unit 106a, 106b, 106c, to produce an output result associated with the processed frame. In embodiments, the data processing module may comprise a deep neural network and the output result may comprise an inference computed by the deep neural network based on the input data frame, such as defect classification, object detection, robotic grasp computation, anomaly detection, and so forth. The controller 104 is configured to assemble the output result and the sequence identifier of each processed frame from the plurality of processing units 106a, 106b, 106c, via the system bus 108.

The output results may typically have lower data volume compared to the input data frames. For example, an input data frame may comprise an HD image frame while the output result may comprise a numerical value indicating an inference computed by a neural network. The disclosed methodology may thus move the high-volume data processing workload away from the controller 104, which may now handle only the low-volume output results. The throughput of the system may be increased by connecting a large number of processing units 106a, 106b, 106c, . . . to the controller system bus 108 for processing high-volume data, thereby providing scalability. By using multicasting for streaming data, it can be ensured that no additional bandwidth is required for network switch 114 or the system bus 108, which only has to handle low volume data. Therefore, in practice, the scalability (e.g., number of modularly connected processing units) that can be achieved may be limited only by the capability of the sensor 110.

In one embodiment, as shown in FIG. 1, the system 100 may additionally include a human machine interface (HMI) device 116 communicatively coupled to the controller 104, for example, conveniently via the same network switch 114, or via another switch. The controller 104 may be configured to communicate the assembled output results and the sequence identifiers associated with the processed frames received from each of the processing units 106a, 106b, 106c to the HMI device 116, typically as low-volume data 118. In one suitable implementation, the low-volume data 118 may be efficiently communicated using the OPC UA standard machine-to-machine communication protocol, where the controller 104 may be configured as an OPC UA server and the HMI device 116 as an OPC UA client configured to subscribe to the low-volume data 118 via the network switch. Furthermore, the HMI device 116 may be configured as another endpoint belonging to the group of multicast endpoints, for receiving the data stream 112 communicated by the sensor 110 via the network switch 114 (e.g., via IP multicasting as described above). For visualization by an operator, the HMI device 116 may superimpose the output results on respective frames of the multicast data stream 112 utilizing the sequence identifiers, for example, by matching the sequence identifiers in the multicast data stream 112 and the low-volume data 118. For instance, output results comprising location of detected objects or defects communicated via the low-volume data 118 may be superimposed on respective frames of images of a multicast vision data stream 112 by way of bounding boxes overlaid on the frames based on the sequence identifiers of the frames, for visualization via the HMI device 116.

The HMI device 116 is typically not inside a control loop, hence the requirement on determinism for the HMI device 116 can be minimal. Often, the primary goal of the HMI device 116 may be to visualize the output results for human operators. In one embodiment, the HMI device 116 may comprise a PC-based system, which can provide flexibility to implement the visualization without the need to guarantee a hard real time system. Thus, while the controller 104 may typically comprise a hard real time system that provides results for control loops, the HMI device 116 may provide flexible interface for a human operator to consume. In this way, the HMI and control tasks can also be efficiently distributed.

In various embodiments, based on the sequence identifiers attached to the frames of the data stream 112, the high-volume data processing workload may be balanced and distributed to each processing unit 106a, 106b, 106c, . . . via various schemes, non-limiting examples of which are illustrated herein below.

Figure 2:
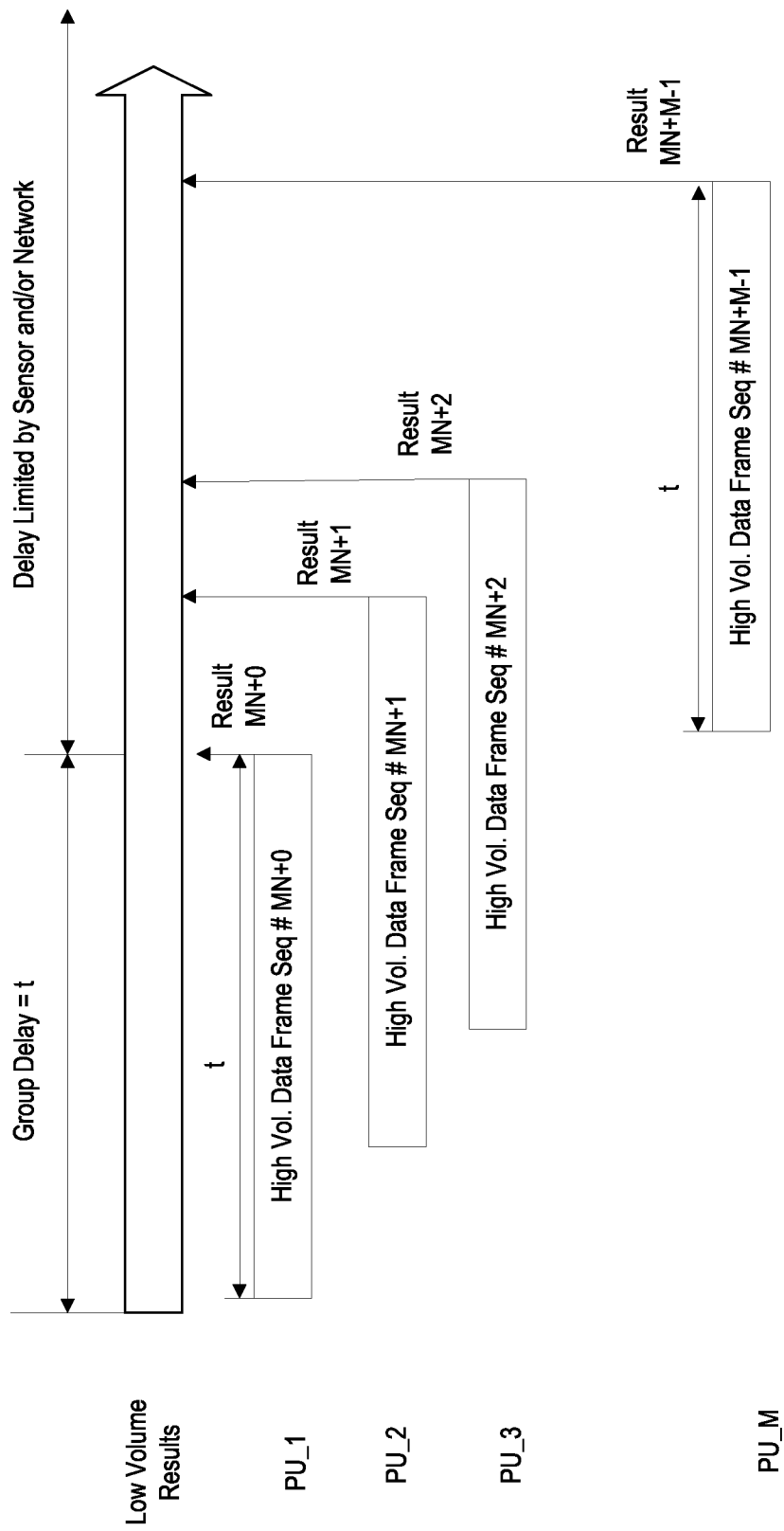
FIG. 2 is a schematic illustration of a scheduling mechanism according to an example embodiment.

In one example scheme, each of the processing units 106a, 106b, 106c may be configured to execute the same data processing module in real time but process different frames of the data stream 112 based on a scheduling mechanism. The scheduling mechanism may be defined in dependence of the sequence identifier of individual frames of the data stream 112. A simple example of a scheduling mechanism is schematically shown in FIG. 2. In this example, there are M number of processing units, denoted as PU_1, PU_2, PU_3, . . . PU_M. Each of the processing units may process a particular frame of the high-volume data stream, based on a sequence number of the frame. The sequence number of the frames can be directly attached to the multicast frames communicated by the sensor, or can be otherwise derived, for example, from the timestamps attached to the frames. The scheduling mechanism in this example may provide that each processing unit processes every $M^{th}$ frame. The processing unit that is going to process a particular frame may be determined by: S mod M, where S is the sequence number of the frame, M is the number of processing units and mod refers to a modulo operation. Thus (for an integer N), if the frame sequence number is MN+0, then S mod M=0, and the frame may be processed by processing unit PU_1. Likewise: if the frame sequence number is MN+1, then S mod M=1, and the frame may be processed by processing unit PU_2; if the frame sequence number is MN+2, then S mod M=2, and the frame may be processed by processing unit PU_3; if the frame sequence number is MN+M−1, then S mod M=M−1, and the frame may be processed by processing unit PU_M; and so forth. The illustrated scheme is exemplary and various other schemes may be devised to implement the scheduling mechanism.

A scheduling mechanism, such as that described above, can comprise a pipeline, such that as long as there are enough processing units connected to the controller, the computational latency of each of the processing units can be hidden inside the pipeline. For example, as shown in FIG. 2, there may be an initial delay referred to as "group delay", which may be dependent on the computational latency or processing time t required to produce the first result, e.g., the result MN+0 produced by processing PU_1. However, by using a large number of processing units, it can be ensured that for the results of the subsequently processed frames, there is minimal or no additional delay incurred by the processing times t of the subsequent frames. That is, any subsequent delay after the group delay may be determined only by the sensor and/or network limitations. The described arrangement may be particularly suitable on a production line, which can be also scheduled as a pipeline, for example, by placing an actuator/robot to execute a control action based on the output results further down the line to compensate the group delay. Since the high-volume data processing can be the most time-consuming part, the scheduling mechanism can linearly increase the throughput of the system with the increased number of the processing units plugged on to the controller system bus.

Turning back to FIG. 1, in another example scheme, the processing units 106a, 106b, 106c may be configured to execute, in parallel, different data processing modules or tasks. For example, in an inspection system for a production line, each of the processing units 106a, 106b, 106c may execute a different data processing module to produce output results pertaining to a different quality aspect of a product on the production line. Thus, in this example use case, based on a single vision data stream 112 communicated by a camera 110, the processing unit 106a may run a first neural network to produce a first inference (output result) classifying structural defects, the processing unit 106b may run a second neural network to produce a second inference classifying assembly defects, the processing unit 106c may run a third neural network to produce a third inference classifying color defects, and so on. Each processing unit 106a, 106b, 106c may selectively process frames of the vision data stream 112, for example, based on a timestamp or other sequence identifier corresponding to the instant when a product being conveyed on the production line is appropriately positioned in relation to a stationary camera 110. The timestamp may be determined, for example, based on the speed of the conveyor system of the production line, spacing between the products, FPS of the camera, among other factors. The timestamps selected by the processing units 106a, 106b, 106c for processing respective frames may be the same or different. Thus, for P number of data processing tasks, the disclosed methodology can produce P inferences in parallel by distributing the computational workload to P number of processing units configured as multicast endpoints to process a single high-volume data stream.

Figure 3:
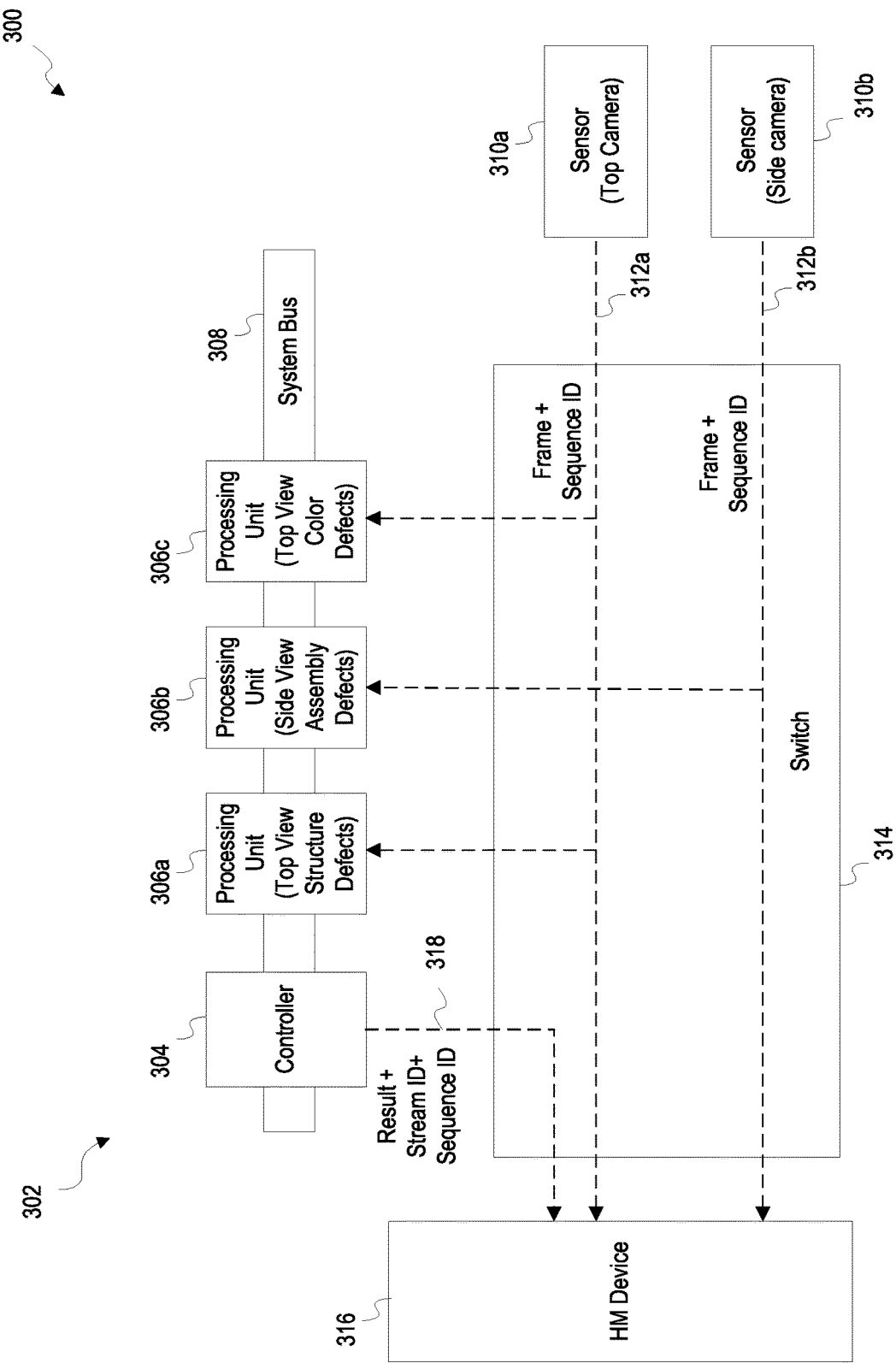
FIG. 3 is a schematic block diagram illustrating an example of a system for processing data involving parallel processing of multiple applications based on sensor data streamed by multiple sensors.

FIG. 3 illustrates an example of a system 300 for processing data involving parallel processing of multiple applications based on sensor data streamed by multiple sensors. As shown, the system 300 comprises an industrial control system 302 that includes a controller 304 and a plurality of processing units 306a, 306b, 306c modularly connected to the controller 304 via a system bus 308 of the controller 304. The structure and example implementations of the industrial controller 302, including that of the controller 304 and the processing units 306a, 306b, 306c, may correspond to that shown in FIG. 1, and hence will not be described again for brevity. According to an example use case, the system 300 may comprise an inspection system for a production line. The processing units 306a, 306b, 306c may be configured to execute different data processing modules (e.g., comprising neural networks) in parallel, such as a first neural network for classifying top view structure defects, a second neural network for classifying side view assembly defects and a third neural network for classifying top view color defects, respectively.

The system 300 may comprise multiple sensors, such as a first sensor 310a and a second sensor 310b for acquiring sensor data from a factory floor. As per the illustrated use case, the first sensor 310a may comprise a first camera positioned for capturing a top view of a product conveyed on a production line, while the second sensor 310b may comprise a second camera positioned for capturing a side view of that product. In an example implementation, the sensors 310a, 310b may comprise GigE Vision® industrial cameras. Each of the sensors 310a, 310b may be configured to packetize the sensor data and communicate the sensor data as a respective multicast data stream, namely a first multicast data stream 312a and a second multicast data stream 312b. Further, each frame of the respective data stream 312a, 312b may be tagged with a sequence identifier (e.g., a timestamp and/or a sequence number) indicative of a position of that frame in that data stream 312a, 312b. Aspects of sequential tagging and multicasting of packetized sensor data that have been previously described in connection with FIG. 1 may be applied in the present example of FIG. 3.

The system 300 may also include a network switch 314 (e.g., a GigE switch) configured to distribute each of the respective data streams to one of multiple groups of multicast endpoints. In the present example, the network switch 314 may distribute the first multicast data stream 312a to a first group of multicast endpoints and distribute the second multicast data stream 312b to a second group of multicast endpoints. The network switch 314 may comprise a plurality of ports enabling Ethernet communication links individually with processing units 306a, 306b, 306c and the sensors 310a, 310b. In an alternate embodiment, separate network switches may be employed to accomplish distribution of multicast data into multiple different groups of multicast endpoints.

Each of the processing units 306a, 306b, 306c connected to the controller 304 may be configured as a respective endpoint belonging to one of the multiple groups of multicast endpoints, to receive a single data stream 312a or 312b for processing. In the present example, the processing units 306a, 306c may be configured as an endpoint belonging to the first group of endpoints for receiving the data stream 312a, while the processing unit 306b may be configured as an endpoint belonging to the second group of endpoints for receiving the data stream 312b. In one embodiment, a technique of IP multicasting may be employed, such as that described above, where a first group IP address may be used by the first sensor 310a and the processing units 306a, 306c to respectively send and receive the first multicast data stream 312a, and a second group IP address may be used by the second sensor 310b and the processing unit 306b to respectively send and receive the second multicast data stream 312b.

Each processing unit 306a, 306c may be configured to selectively process frames of the first data stream 312a in dependence of the sequence identifier (e.g., timestamp or sequence number) of individual frames in the first data stream 312a. The processing unit 306b may be configured to selectively process frames of the second data stream 312b in dependence of the sequence identifier (e.g., timestamp or sequence number) of individual frames in the second data stream 312b. For example, the processing units 306a, 306b, 306c may selectively process frames of the associated multicast data stream 312a, 312b based on a timestamp or other sequence identifier corresponding to the instant when a product being conveyed on the production line is appropriately positioned in relation to the respective camera 310a, 310b. The timestamps selected by the processing units 306a, 306b, 306c for processing respective frames may be the same or different.

A frame of a multicast data stream 312a, 312b, when selected to be processed by the associated processing unit 306a, 306b, 306c, may be fed as an input to the respective data processing module. The data processing module may be executed by the respective processing unit 306a, 306b, 306c to produce an output result associated with the processed frame. The controller 304 may be configured to assemble the output result and the sequence identifier of each processed frame of each of the data streams 312a, 312b from the plurality of processing units 306a, 306b, 306c, via the system bus 308.

In one embodiment, as shown in FIG. 3, the system 300 may additionally include an HMI device 316 communicatively coupled to the controller 304, for example, conveniently via the same network switch 314, or via another switch. The controller 304 may be configured to communicate the assembled output results, the data stream identifiers (e.g., indicative of the source of the data stream 312a, 312b), and the sequence identifiers associated with the processed frames received from each of the processing units 306a, 306b, 306c to the HMI device 316, typically as low-volume data 318. In one suitable implementation, the low-volume data 318 may be efficiently communicated using the OPC UA standard machine-to-machine communication protocol, where the controller 304 may be configured as an OPC UA server and the HMI device 316 as an OPC UA client configured to subscribe to the low-volume data 318 via the network switch. Furthermore, the HMI device 316 may be configured as an endpoint belonging to each of the groups of multicast endpoints, for receiving the data streams 312a, 312b communicated by the sensors 310a, 310b via the network switch 314 (e.g., via IP multicasting as described above). For visualization by an operator, the HMI device 316 may superimpose the output results on respective frames of the multicast data streams 312a, 312b utilizing the data stream identifiers and the sequence identifiers.

Similar to the previously described embodiment, the HMI device 316 may typically not be inside a control loop, with the primary goal being to visualize the output results for human operators. In one embodiment, the HMI device 316 may comprise a PC-based system, which can provide flexibility to implement the visualization without the need to guarantee a hard real time system. In this way, the HMI and control tasks can also be efficiently distributed.

The embodiments of the present disclosure may be implemented with any combination of hardware and software. In addition, the embodiments of the present disclosure may be included in an article of manufacture (e.g., one or more computer program products) having, for example, a non-transitory computer-readable storage medium. The computer readable storage medium has embodied therein, for instance, computer readable program instructions for providing and facilitating the mechanisms of the embodiments of the present disclosure. The article of manufacture can be included as part of a computer system or sold separately.

The computer readable storage medium can include a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. Computer readable program instructions described herein can be downloaded to respective computing/processing devices from a computer readable storage medium or to an external computer or external storage device via a network, for example, the Internet, a local area network, a wide area network and/or a wireless network.

The system and processes of the figures are not exclusive. Other systems, processes and menus may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the appended claims.

What is claimed is:

1. A system for processing data in an industrial environment, comprising:
    at least one sensor configured to communicate sensor data acquired from a factory floor as a multicast data stream, wherein each frame of the data stream is tagged with a sequence identifier indicative of a position of that frame in the data stream,
    at least one network switch configured to distribute the data stream communicated by the sensor to a group of multicast endpoints, and
    a control system comprising a controller and a plurality of processing units modularly connected to the controller, each processing unit being further connected to the network switch and configured as a respective endpoint of the group of multicast endpoints,
    wherein frames of the data stream are selectively processable by each processing unit in dependence of the sequence identifier of individual frames by executing a data processing module, to produce an output result associated with each processed frame, and
    wherein the controller is configured to assemble the output result and the sequence identifier of each processed frame from the plurality of processing units.

2. The system according to claim 1, wherein the sequence identifier of each frame of the data stream is defined by a timestamp tagged to the frame.

3. The system according to claim 1, further comprising a human machine interface (HMI) device communicatively coupled to the controller, wherein the controller is configured to communicate the assembled output results and the sequence identifiers associated with the processed frames to the HMI device.

4. The system according to claim 3,
    wherein the HMI device is connected to the network switch and configured as an endpoint belonging to the group of multicast endpoints, for receiving the multicast data stream communicated by the sensor, and
    wherein the HMI device is configured to superimpose the output results on respective frames of the multicast data stream utilizing the sequence identifiers.

5. The system according to claim 1, wherein a same data processing module is executable by the plurality of processing units based on a scheduling mechanism defined in dependence of the sequence identifier of individual frames of the data stream.

6. The system according to claim 1, wherein different data processing modules are executable in parallel by the plurality of processing units.

7. The system according to claim 6,
wherein the system comprises an inspection system for a production line, and
wherein the different data processing modules are executable by the respective processing units to produce output results pertaining to different quality aspects of individual products on the production line.

8. The system according to claim 6,
wherein the at least one sensor comprises multiple sensors, each configured to communicate sensor data acquired from a factory floor as a respective multicast data stream, wherein each frame of the respective data stream is tagged with a sequence identifier indicative of a position of that frame in the data stream,
wherein the at least one network switch is configured to distribute each of the respective data streams to one of multiple groups of multicast endpoints, and
wherein each processing unit connected to the controller is configured as a respective endpoint belonging to one of the multiple groups of multicast endpoints, to receive a single data stream for processing.

9. The system according to claim 1, wherein one or more of the data processing modules comprises a neural network.

10. The system according to claim 1, wherein the controller comprises a programmable logic controller (PLC) and the plurality of processing units are modularly connected to a backplane of the PLC.

11. The system according to claim 1, wherein each processing unit comprises a neural processing unit (NPU).

12. A method for processing data in an industrial environment, comprising:
communicating, via at least one sensor, sensor data acquired from the factory floor as a multicast data stream, wherein each frame of the data stream is tagged with a sequence identifier indicative of a position of that frame in the data stream,
distributing, via at least one network switch, the data stream communicated by the sensor to a group of multicast endpoints,
processing the data stream by a control system comprising a controller and a plurality of processing units modularly connected to the controller, each processing unit being further connected to the network switch and configured as a respective endpoint of the group of multicast endpoints, wherein processing the data stream by the control system comprises:
selectively processing, by each processing unit, frames of the data stream in dependence of the sequence identifier of individual frames by executing a data processing module, to produce an output result associated with each processed frame, and
assembling, by the controller, the output result and the sequence identifier of each processed frame from the plurality of processing units.

13. The method according to claim 12, wherein the sequence identifier of each frame of the data stream is defined by a timestamp tagged to the frame.

14. The method according to claim 12, further comprising:
communicating, by the controller, the assembled output results and the sequence identifiers associated with the processed frames to a human machine interface (HMI) device.

15. The method according to claim 14, wherein the HMI device is connected to the network switch and configured as an endpoint belonging to the group of multicast endpoints, the method further comprising:
receiving, by the HMI device, the multicast data stream communicated by the sensor, and
superimposing, by the HMI device, the output results on respective frames of the multicast data stream utilizing the sequence identifiers.

16. The method according to claim 12, comprising executing the same data processing module by the plurality of processing units based on a scheduling mechanism defined in dependence of the sequence identifier of individual frames of the data stream.

17. The method according to claim 12, comprising executing, in parallel, different data processing modules by the plurality of processing units.

18. The method according to claim 17,
wherein the method is executed by an inspection system for a production line, and
wherein the different data processing modules are executed by the respective processing units to produce output results pertaining to different quality aspects of individual products on the production line.

19. The method according to claim 17,
communicating, via multiple sensors, sensor data acquired from the factory floor as a respective multicast data stream, wherein each frame of the respective data stream is tagged with a sequence identifier indicative of a position of that frame in the data stream,
distributing, via the at least one network switch, each of the respective data streams to one of multiple groups of multicast endpoints, wherein each processing unit connected to the controller is configured as a respective endpoint belonging to one of the multiple groups of multicast endpoints, and
receiving, by each processing unit, a single data stream for processing.

20. A non-transitory computer-readable storage medium including instructions that, when processed by a computing system, configure the computing system to perform the method according to claim 12.

* * * * *